United States Patent [19]
Van Gestel

[11] Patent Number: 5,905,537
[45] Date of Patent: *May 18, 1999

[54] METHOD AND DEVICE FOR TRANSMITTING AND RECEIVING TELETEXT DATA

[75] Inventor: Henricus A. W. Van Gestel, Eindhoven, Netherlands

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/718,790

[22] Filed: Sep. 24, 1996

[30] Foreign Application Priority Data

Sep. 25, 1995 [EP] European Pat. Off. .............. 95202581

[51] Int. Cl.$^6$ ............................. H04N 7/00; H04N 11/00; H04N 5/446
[52] U.S. Cl. ........................... 348/468; 348/467; 348/563
[58] Field of Search ..................................... 348/468, 467, 348/563, 564; H04N 7/00, 11/00, 5/448

[56] References Cited

U.S. PATENT DOCUMENTS

| | | |
|---|---|---|
| 4,679,082 | 7/1987 | Shibasaki ................................ 348/468 |
| 4,829,569 | 5/1989 | Seth-Smith et al. ......................... 348/6 |
| 4,953,022 | 8/1990 | Bugg ....................................... 348/468 |
| 5,038,212 | 8/1991 | Van Den Hombergh et al. ..... 348/468 |
| 5,355,170 | 10/1994 | Eitz et al. ............................... 348/468 |
| 5,410,359 | 4/1995 | Odijk et al. ............................. 348/468 |

OTHER PUBLICATIONS

World System Teletext, Technical Specification, revised Mar. 1985.

*Primary Examiner*—Nathan Flynn
*Assistant Examiner*—Vivek Srivastava
*Attorney, Agent, or Firm*—Steven S. Rubin

[57] ABSTRACT

By encoding references to teletext pages as an offset to a referenced teletext page, significant gains in transmission efficiency can be realized. The current teletext standard provides a mechanism for linking teletext pages, but the maximum number of different links supported by the teletext standard is insufficient to cover the need for more links for novel media services such as the transmission of Electronic Program Guides (EPG). An efficient extension of the number of links which can be supported is provided by coding further links as an offset with respect to the existing links in a conventional teletext link packet.

18 Claims, 3 Drawing Sheets

FIG. 2A
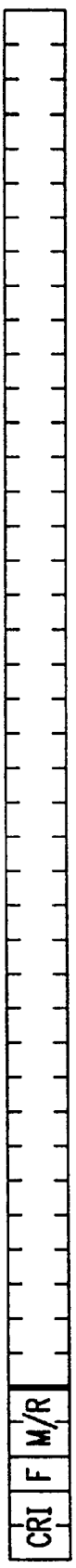
FIG. 2B
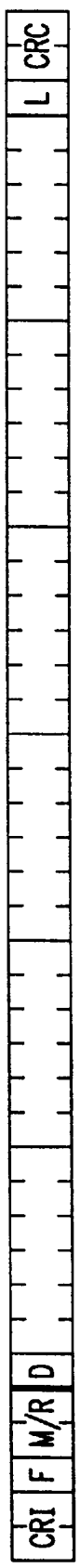
FIG. 2C
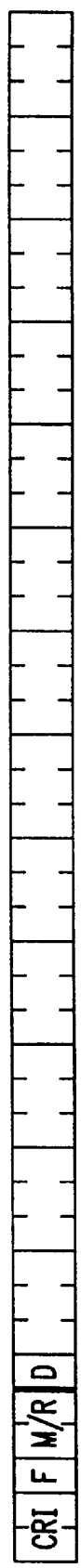
FIG. 2D

METHOD AND DEVICE FOR TRANSMITTING AND RECEIVING TELETEXT DATA

BACKGROUND OF THE INVENTION

1. Field of the Invention

This invention relates to a method and device (transmitter and receiver) for transmitting and receiving teletext data. The invention also relates to a teletext signal and to a storage medium on which such a signal is stored.

2. Description of Related Art

A known method of transmitting teletext data is described in "World System Teletext", Technical Specification, revised March 1985, herein referred to as WST specification. Section 12 of this specification describes a data format of packets X/27. These are teletext packets having magazine number X and row number 27. Such packets having a row number greater than 24 are also referred to as "ghost rows" because they are ignored by the first-generation ("Level 1") teletext decoders.

Packets X/27 provide a mechanism for accommodating references ("links") to given teletext pages in a teletext data signal. As described in the WST specification, a teletext packet X/27 comprises a maximum number of 6 references in the form of a teletext page number and sub-code. Moreover, the packet comprises a 4-bit designation code with which a maximum number of 16 different packets X/27 can be distinguished. If the designation code has one of the values 0–3, then the references are referred to as "navigational links". With these references, the editor of a teletext page can indicate which other pages the user will most likely choose as the next pages. A multipage teletext decoder may acquire the relevant pages already at an early stage so that the waiting time for linked pages can be reduced considerably. If the designation code has one of the values 4–7, then the references are referred to as "editorial links" or "compositional links". The linked pages then comprise data for enhancing the basic page. The function of packets X/27 with designation codes 8–15 has not been laid down yet. With the packets X/27 hitherto laid down, 8*6=48 different linked pages may thus be referred to within a teletext magazine.

SUMMARY OF THE INVENTION

It is an object of the invention to provide the facility of referring to a maximum number of teletext pages with a minimal transmission overhead. It is also an object of the invention to provide the facility of referring to specific parts of these teletext pages in a teletext data stream.

To this end, the invention provides a method of transmitting teletext data having a plurality of references to teletext pages, in which at least one of the references is transmitted in the form of an absolute page number, and is characterized in that further references are transmitted in the form of an offset with respect to said page number. Since the transmission of an offset requires a considerably smaller number of bits than the transmission of a full teletext page number, many references can be transmitted in an effective manner.

An embodiment of the method, in which a plurality of references is transmitted in the form of a series of page numbers, is characterized in that the further references comprise an address so as to indicate which of the series of page numbers the offset applies to. With this embodiment, each of the series of page numbers in a packet X/27 may serve as a reference for further references. The number of links thus increases even further.

In another embodiment of the method, the further references comprise coordinates so as to indicate which part of the corresponding teletext page the reference relates to. In this way, references to specific parts of a page, for example text rows or rectangular text blocks, may be accommodated in a teletext signal.

The invention is particularly applicable to novel information services in which it is desirable to provide many references to (parts of) available teletext pages in a simple and effective way. An example of such a novel information service is the "Electronic Program Guide" (EPG). This is a combination of an overview of television program data and a menu structure to render the information in this overview accessible to the user. It is true that EPG is expected to be transmitted as a teletext signal, but not in its conventional form of individually accessible teletext pages. However, in practice, an overview of television programs is already transmitted in the form of regular teletext pages. The method according to the invention provides the possibility of referring to the information on these pages in an efficient way, so that duplication of transmission capacity is avoided.

BRIEF DESCRIPTION OF THE FIGURES

FIGS. 2A–2D show examples of data packets transmitted by a transmission station shown in FIG. 1.

DESCRIPTION OF PREFERRED EMBODIMENTS

Figures 1, 3:
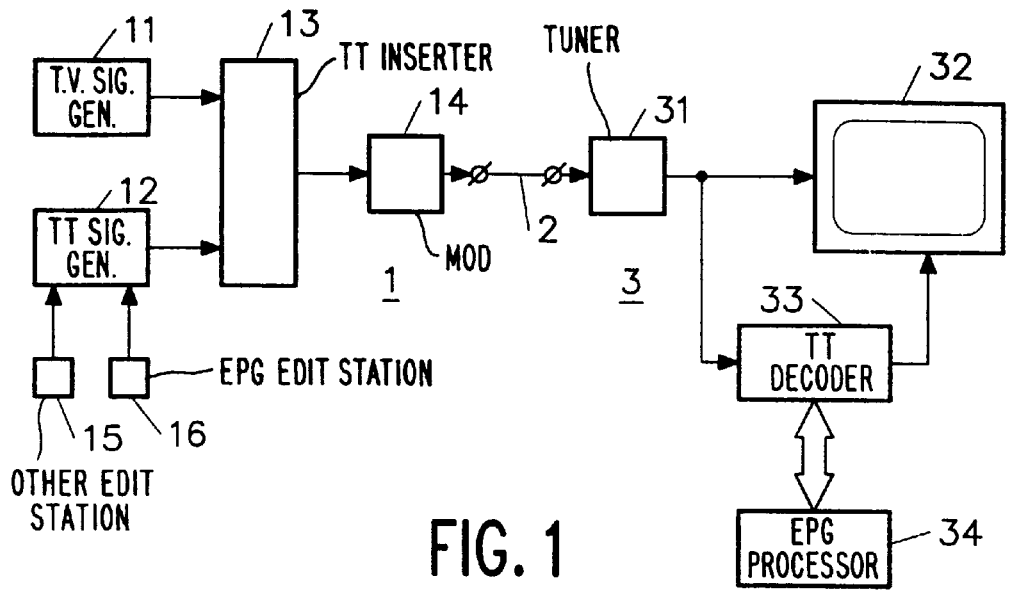
FIG. 1 shows diagrammatically a teletext transmission system to explain the method according to the invention.
FIG. 3 shows an example of a teletext broadcast to explain the method according to the invention.

FIG. 1 shows diagrammatically a teletext transmission system to explain the method according to the invention. The system comprises a transmission station 1, a transmission medium 2 and a receiver 3. The transmission medium may alternatively be a storage medium such as a videotape on which a television signal including teletext data is stored. The transmission station comprises a television signal generator 11, a teletext signal generator 12, a teletext inserter 13 and a modulator 14. The television generator 11 generates a picture signal and the teletext generator 12 generates a teletext signal. The teletext signal comprises a "regular" teletext broadcast of individually accessible pages with news, sports scores, weather forecasts, television programs and the like. This regular teletext signal is generated in a first editing terminal 15. The teletext signal further comprises a data signal by means of which an electronic TV guide in a coded form is transmitted. This "EPG data signal" is composed in a second editing terminal 16.

The picture signal and the teletext signal are combined in teletext inserter 13 into a video signal which is applied to the modulator 14 and is transmitted via transmission medium 2. The receiver 3 comprises a tuner 31 for demodulating the video signal. The demodulated video signal is applied for further processing and display to a television monitor 32. The video signal is also applied to a teletext decoder 33. This decoder decodes the "regular" teletext signal accommodated therein in further known manner and displays the pages on television monitor 32. The teletext decoder also receives the EPG signal and applies this for further processing to an EPG processor 34.

For each transmitted teletext page, the teletext signal comprises a plurality of data packets which are accommodated in further known manner in picture lines of the video signal during the picture flyback. FIG. 2 shows some possible forms of these data packets in greater detail. As has been attempted to show in this Figure, each data packet comprises 45 bytes of 8 bits each. The first 2 bytes having a fixed value 1010..10 are referred to as "clock run-in" and are denoted by CRI in the Figure. The third byte is a "framing code" F and also has a fixed value. The next 2 bytes comprise a 3-bit magazine number M and a 5-bit row number R. The significance of the other 40 bytes depend on the value of the row number R.

If the row number R has the value 0, as is assumed in FIG. 2A, the data packet constitutes a page header of a teletext page. The series of 40 bytes of such a page header starts with two digits T (tens) and U (units) of the page number, a sub-code SC and a plurality of control bits C. The remaining part comprises 24 character positions with a page header HDR and 8 character positions for displaying the current time. The transmission of a teletext page starts with, and implies, the page header of this page. The page number is constituted by the magazine number M, tens T and units U. It is a 3-digit number and is generally between 100 and 899 in order that the user can select it by means of a decimal keyboard. The sub-code SC is an extension of the page number MTU. The combination of both is here referred to as "full page number". The page header and the subsequent packets having the same magazine number M constitute the relevant page. In general, a series of teletext pages is transmitted in a repetitive cycle.

If the row number R has one of the values 1–24, as is assumed in FIG. 2B, then the 40 bytes constitute a text row of 40 characters for display on a display screen in accordance with the Level 1 display format.

If the row number R has the value 27, as is assumed in FIG. 2C, then it is a "linked page packet X/27". Such a packet starts with a 4-bit designation code D, by means of which a maximum number of 16 packets X/27 can be coupled to a Level 1 page. For the packets with designation code D=0 . . . 7, the data format is laid down in the WST specification. As has been attempted to show in FIG. 2C, the packet then comprises six groups of 6 bytes each, each group comprising the full number of another teletext page. "Full" means that the group specifies the magazine number M, tens T, units U and sub-code SC of the page. Within a teletext broadcast, a maximum number of 8*6=48 different pages may thus be referred to. If the designation codes 8 . . . 15 are also used in this manner, the maximum number is 16*6=96.

In accordance with the invention, the number of references to other teletext pages is extended by means of additional linked page packets. These may be packets having a row number which is different from 27, for example 26 or 28. They may also be packets having row number 27 and a designation code D=8 . . . 15. In any case, it is desirable in connection with compatibility that the coding is not contradictory to the current WST specification.

It will hereinafter be assumed that the additional linked page packets have row number 26. A possible data format of these packets is shown in FIG. 2D. The first of the 40 data bytes is again a 4-bit designation code D, by means of which a distinction between a plurality of packets 26 is possible. The other 39 bytes are divided into 13 groups of 3 bytes each, referred to as triplets. Each triplet comprises 18 information bits and 6 parity bits for Hamming protection. The 18 information bits of each triplet are divided into a 6-bit address field, a 5-bit mode field and a 7-bit data field. In FIG. 2D, the bits of the address field are denoted by A, the bits of the mode field are denoted by M, and the bits of the data field are denoted by D, while the protection bits are denoted by P. This division of packet 26 into triplets is known per se from the WST specification.

Page linking is now allocated to one of the still available values of the mode field. A triplet with such a mode field is hereinafter also referred to as "page link triplet". The data field in such a page link triplet represents a teletext page number. The page number is coded as an offset with respect to a predetermined page number P in packet X/27, for example, the first of the six page numbers in packet X/27 with designation code D=4. Different embodiments are possible for coding the 7-bit data field. A possible embodiment is a 7-bit data field (signed or unsigned) comprising an integer n with which a link is established to page number P+n. In a second embodiment, the data field comprises a first integer $n_1$ and a second integer $n_2$ with which a link is established to page $P+n_1$ with subcode $SC+n_2$.

So far, the address field of a page link triplet has had no significance. An even further extension of the number of links is obtained by addressing, by means of the address field, the page number in packets X/27 to which the offset relates. As already mentioned hereinbefore, the current WST specifications provides for a maximum number of 48 linked pages. They may be considered as a series, starting at the first page number in packet X/27 with designation code D=0 and ending at the sixth number in packet X/27 with designation code D=7. The 6-bit address field in a page link triplet now indicates which of the 48 page numbers the offset in the data field relates to.

As described so far, a page link triplet refers to a teletext page. However, it is often desirable to be able to refer to a specific part of the relevant teletext page. In accordance with the invention, the page link triplet in packet X/26 is followed by one or more triplets which will be referred to as "text link triplets". Similarly to a page link triplet, the text link triplet is divided into an address field, a mode field and a data field. Different types of text link triplets are feasible, dependent on the value of the mode fields. A first type specifies a row of the teletext page, for example, because the address field is indicative of the row number. A second type specifies the top left corner and/or the bottom right corner of a rectangular text block of the teletext page in which, for example, the address field is indicative of the row number and the data field is indicative of the column number.

FIG. 3 shows an example of a teletext broadcast to explain the method according to the invention. In the Figure, the reference numeral 201 denotes an EPG page with a hexadecimal page number EFO. A series of such pages constitutes the EPG data signal with which a file of television program data of various television stations is transmitted. However, the program data of BBC1 and BBC2 are not accommodated in the EPG data signal because they have already been mentioned on regular teletext pages 202 and 203, respectively. To couple the program data of BBC1 and BBC2 to the EPG file, EPG page EFO comprises a linked page packet X/27, denoted by the reference numeral 204, and a packet X/26, denoted by the reference numeral 205. As has been attempted to show in the Figure, the last (sixth) link in packet X/27 refers to teletext page 601.

The page number 601 in packet X/27 constitutes the reference for further references 206 and 207 in packet X/26. More particularly, the first triplet of reference 206 in packet X/26 is a page linking triplet whose address field has the value 6 and the data field has the value 0. Thus, this triplet refers to the teletext page number having an offset 0 with respect to the sixth link in packet X/27. The corresponding page number is 601+0=601. The next three triplets of reference 206 refer to rows 7, 8 and 9 of this page, hence the individual program titles of the station BBC1. The first triplet of reference 207 in packet X/26 is again a page linking triplet. Its address field has the value 6 and the data field has the value 1. Thus, this triplet refers to teletext page 601+1=602, i.e. the regular teletext page with BBC2 programs. The next three triplets of reference 207 refer to the rows 7, 8 and 9, hence to the individual program titles of the station BBC2.

Figure 4:
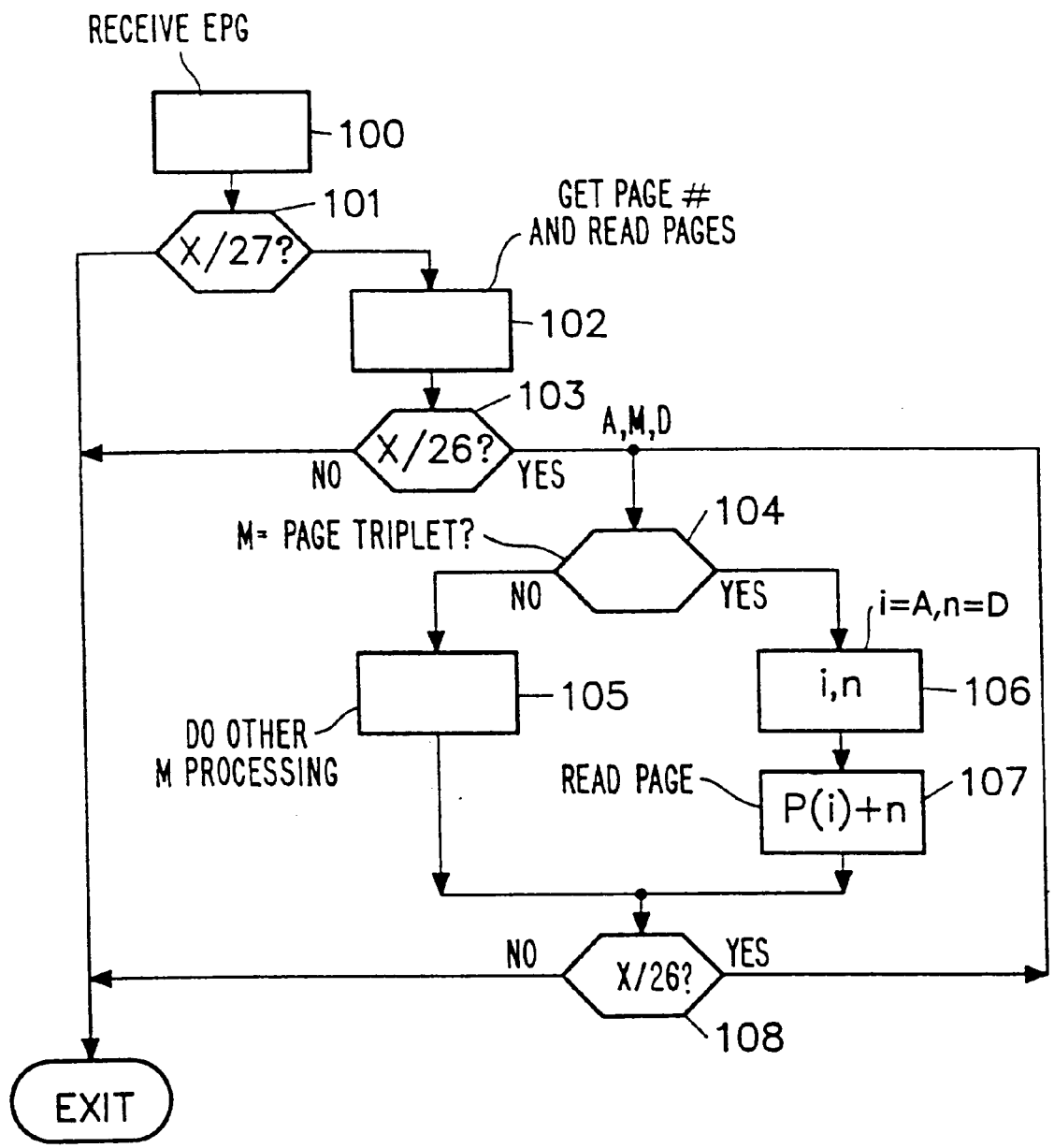
FIG. 4 shows the flow chart of a program performed by a processor shown in FIG. 1.

FIG. 4 shows the flow chart of a program performed by the EPG processor 34 (see FIG. 1). In a step 100, the processor receives EPG data from the teletext decoder (33 in FIG. 1), for example, a teletext page with a hexadecimal page number which is not accessible as a "regular" teletext page. In a step 101, the processor checks whether this page comprises one or more packets X/27. If this is the case, the processor decodes, in a step 102, the page numbers accommodated therein and sorts them in the sequence to bereceived. Thus, a series of page numbers P(1), P(2), etc. is obtained. The processor also instructs the teletext decoder to acquire the relevant pages.

In a step 103, the processor checks whether the received page also comprises one or more packets X/26. If this is the case, the next triplet is decomposed into an address field, a mode field and a data field. In a step 104, it is checked with reference to the mode field whether the triplet is a page linking triplet. If this is not the case, an action defined by the mode field is carried out in a step 105.

If the triplet is a page linking triplet, the value of the address field is assigned to an index i and the value of the data field is assigned to an offset n in a step 106. Subsequently, the ith page number P(i) of the series of page numbers P(1), P(2), etc. is read in a step 107. The offset n is presented to the teletext decoder for acquisition. Subsequently, it is checked in a step 108 whether all triplets in packet X/26 have been processed. As long as this is not the case, the processor reverts to the step 104 so as to process the next triplet.

In summary, the invention relates to a method and device for transmitting and receiving teletext data. The current teletext standard provides a page linking mechanism by means of packets X/27. Each linked is a 6-byte group, which involves a significant transmission capacity. The maximum number of different links is insufficient to cover the need for more links for novel media services such as the transmission of Electronic Program Guides (EPG). The invention provides an efficient extension of the number of links by coding further links as an offset with respect to a link in packet X/27. Moreover, the invention provides the possibility of referring to parts (row, text block) of a teletext page.

What is claimed is:

1. A method of transmitting teletext data having a plurality of references to teletext pages, comprising:

transmitting at least one of the references to said teletext pages in the form of an absolute page number, and transmitting further references to said teletext pages in the form of an offset with respect to said absolute page number, wherein said offset requires less memory than said absolute page number.

2. A method for transmitting teletext data having a plurality of references to teletext pages, said method comprising:

transmitting at least one of the references to said teletext pages in the form of a page number;

transmitting further references to said teletext pages in the form of an offset with respect to said page number; and transmitting a plurality of references to said teletext pages in the form of a series of page number;

wherein the further references to said teletext pages comprise an address so as to indicate to which of the series of page numbers the offset applies, and wherein said offset comprises a smaller number of bits than does the absolute page number.

3. A method as claimed in claim 1, wherein the further references to said teletext pages comprise coordinates for indicating to which part of the corresponding teletext page the reference relates.

4. A method of receiving teletext data having a plurality of references to teletext pages, said method comprising:

receiving at least one of the references to said teletext pages in the form of a page number, receiving further references to said teletext pages in the form of an offset with respect to said page number, said offset requiring less memory than said page number, and determining a desired page number from said page number and said offset.

5. A method as claimed in claim 4, further comprising:

receiving a plurality of references to said teletext pages in the form of a series of page numbers, wherein, together with the further references to said teletext pages, an address is received, and determining to which of the series of page numbers the offset applies based on said address.

6. A method as claimed in claim 4, further comprising:

receiving coordinates with the further references to said teletext pages; and determining, based on said coordinates, to which part of the corresponding teletext page the reference relates.

7. A transmitter for transmitting teletext data having a plurality of references to teletext pages, comprising:

an encoder for encoding said teletext data;

said encoder including a first means for encoding at least one of the references to said teletext pages in the form of a page number, and said encoder further including a second means for encoding further references to said teletext pages in the form of an offset with respect to said page number, said offset requiring less memory than said page number.

8. A transmitter as claimed in claim 7, wherein said encoder further includes a third means for encoding a plurality of references to said teletext pages in the form of a series of page numbers, and wherein the transmitter adds an address to the further references to said teletext pages indicating to which of the series of page numbers the offset applies.

9. A transmitter as claimed in claim 7, wherein the transmitter further includes a means for adding coordinates to the further references to said teletext pages indicating to which part of the corresponding teletext page the reference relates.

10. A receiver for receiving teletext data having a plurality of references to teletext pages, comprising:

a processor for decoding said teletext data;

said processor including a first decoding means for decoding at least one of the references to said teletext pages which was encoded in the form of a page number, and said processor further including a second decoding means for decoding further references to said teletext pages which were encoded in the form of an offset with respect to said page number, said offset requiring less memory than said page number, wherein said processor has a first means for determining a desired page number from said page number and said offset.

11. A receiver as claimed in claim 10, further comprising:

third means for decoding a plurality of references to said teletext pages which were encoded in the form of a series of page numbers, wherein the processor further includes a second means for determining an address within the further references to said teletext pages and for determining, by means of said address, to which of the series of page numbers the offset applies.

12. A receiver as claimed in claim 10, wherein the processor includes a third means for decoding coordinates within the further references to said teletext pages and a second means for determining, by means of said coordinates, to which part of the corresponding teletext page the reference relates.

13. A method of encoding a teletext signal having a plurality of references to teletext pages, said method comprising:

encoding at least one of the references to said teletext pages in the form of a page number; and encoding further references to said teletext pages in the form of an offset with respect to said page number, said offset requiring less memory than said page number.

14. A storage medium comprising:

a stored teletext signal having a plurality of references to teletext pages, at least one of the references to said teletext pages is stored in the form of a page number, and wherein further references to said teletext pages are stored in the form of an offset with respect to said page number, said offset requiring less memory than said page number.

15. A method as claimed in claim 2, wherein the further references to said teletext pages comprise coordinates so as to indicate to which part of the corresponding teletext page the reference relates.

16. A method as claimed in claim 5, wherein coordinates are received with the further references to said teletext pages, and said method further comprising the step of determining, based on said coordinates to which part of the corresponding teletext page the reference relates.

17. A transmitter as claimed in claim 8, wherein the transmitter further includes means for adding coordinates to the further references to said teletext pages so as to indicate to which part of the corresponding teletext page the reference relates.

18. A receiver as claimed in claim 11, wherein the processor includes a fourth means for decoding coordinates within the further references to said teletext pages and further includes a third means for determining, based on said said coordinates, to which part of the corresponding teletext page the reference relates.

* * * * *